United States Patent [19]

Carlson et al.

[11] Patent Number: 4,749,081
[45] Date of Patent: Jun. 7, 1988

[54] CARRIER FOR RIGID DATA STORAGE DISK

[75] Inventors: Warner P. Carlson; Lawrence W. Wirth, both of Rochester, N.Y.

[73] Assignee: Eastman Kodak Company, Rochester, N.Y.

[21] Appl. No.: 19,854

[22] Filed: Feb. 27, 1987

[51] Int. Cl.⁴ .................................................. B65D 85/57
[52] U.S. Cl. ..................................... 206/309; 206/444; 360/133; 369/77.2; 369/291
[58] Field of Search ............... 206/303, 316, 307, 309, 206/311, 312, 444, 456; 360/97, 133; 369/75.2, 77.2, 270, 291, 77.1; 353/116

[56] References Cited

U.S. PATENT DOCUMENTS 3,081,870  3/1963  Plettner ................................ 206/456
3,718,392  2/1973  Harvey ................................ 206/456
4,627,037  12/1986 Tamaru et al. ....................... 206/309
4,679,182  7/1987  Kamoshita et al. ................ 369/77.2

FOREIGN PATENT DOCUMENTS 0005466  1/1984  Japan .................................... 206/309

Primary Examiner—Jimmy G. Foster
Attorney, Agent, or Firm—Warren W. Kurz

[57] ABSTRACT

Disclosed herein is a carrier for a rigid data storage disk, e.g. an optical, magnetic or magneto-optic disk, for facilitating the transport of such disk within a disk library or the like. Such carrier comprises a generally rectangular frame which is provided with a pair of racks of teeth along opposing lateral edges. Such racks are adapted to be engaged by a toothed conveyor for advancing the carrier along a desired path.

1 Claim, 2 Drawing Sheets

CARRIER FOR RIGID DATA STORAGE DISK

BACKGROUND OF THE INVENTION

This invention relates to the field of data recording and playback and, more particularly, to improvements in apparatus adapted to facilitate the handling of rigid data storage disks (e.g. disks of the optical, magnetic and magneto-optic variety).

In the commonly assigned U.S. patent application Ser. No. 923,509, filed on Oct. 27, 1986 in the names of D. J. Stark, D. J. Petruchik, C. J. Bernitt and B. J. Semmler, entitled "Carrier for Data Storage Disk" there is disclosed a carrier assembly which facilitates the handling of data storage disks. Like similar devices, this carrier assembly comprises a generally rectangular frame having a circular aperture therein which is slightly larger in diameter than the data storage disk with which it is intended for use. Latching means are provided on the frame for releasably latching a disk within the aperture so that, during periods of non-use, the disk is supported by the carrier frame and is readily handled by manipulating the carrier frame, and during periods of use, the disk can be released from the carrier frame and rotated in a plane substantially spaced therefrom. The leading and trailing edges of the carrier frame, as determined by the direction of movement into and out of a disk drive unit, are provided with locating notches and slots which serve to accurately position the carrier and its latched disk relative to the spindle axis of the disk drive. Such carrier-positioning structure is symmetrically arranged on the carrier frame so that the carrier can be received by the disk drive in any one of four different orientations.

In the commonly assigned U.S. patent application Ser. No. 19,903, filed concurrently herewith in the names of H. C. Deck, W. P. Carlson and L. W. Wirth, entitled "Automated Library for Data Storage Disks," there is disclosed a storage and retrieval apparatus for storing a large number of data storage disks, each being supported by a disk carrier of the above type. Such apparatus includes a carrier transport mechanism which, on command, extracts a selected disk carrier from storage and transports such disk to and from a disk utilization device, such as a disk drive. The invention disclosed herein is directed to a disk carrier which is particularly well adapted for use in such storage and retrieval apparatus.

SUMMARY OF THE INVENTION

According to the invention, structure is provided on a disk carrier frame of the aforementioned type of facilitate the precise movement of such carrier within the carrier plane. Such structure takes the form of a pair of racks of teeth, one on each of the lateral edges of the carrier frame extending from the leading edge to the trailing edge. Such racks of teeth are adapted to be engaged by meshing teeth supported by a pair of endless conveyors. When such conveyors are moved into engagement with the carrier's lateral edges, the teeth of the conveyor engage those of the carrier. Movement of the conveyors effects movement of the disk carrier, for example, into and out of a storage location.

The invention will be better understood from the ensuing detailed description of a preferred embodiment, reference being made to the accompanying drawings.

DETAILED DESCRIPTION OF A PREFERRED EMBODIMENT

Figure 1:
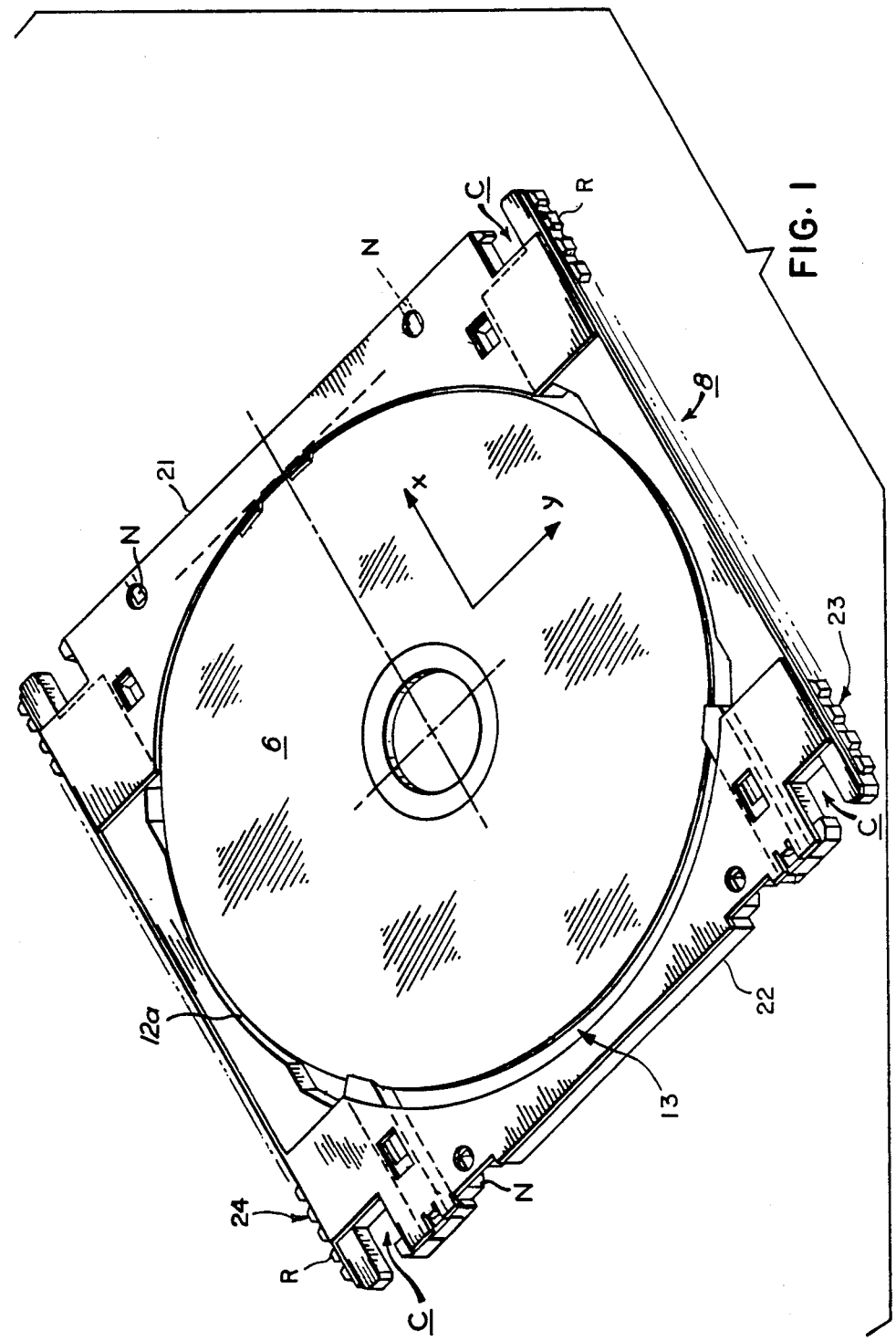
FIG. 1 is a perspective view of a disk carrier embodying the invention.
Figure 2:
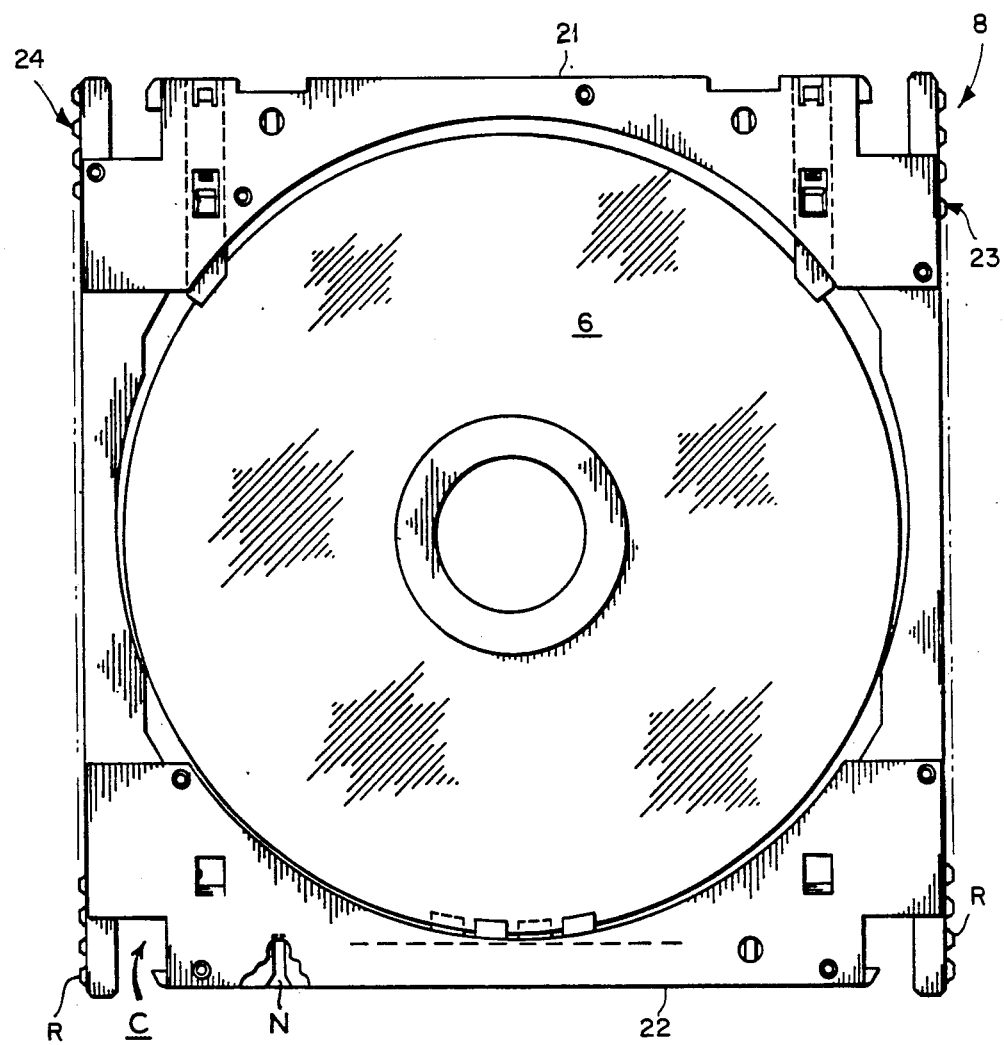
FIG. 2 is a top plan view of the FIG. 1 apparatus.

Referring now to the drawings, the disk carrier of the invention basically comprises a generally rectangular frame 8 which releasably supports a data storage disk 6. The latching mechanism which supports the disk in the carrier's circular aperture 13 is fully disclosed in the aforementioned U.S. application in the names of Stark et al and actually forms no part of this invention. Other unrelated carrier details are also disclosed in the Stark et al application and to the extent necessary or desirable to understand the actual function of such details, the contents of such application is herein incorporated by reference. It suffices to say, however, that frame 20 functions to releasably support a disk as shown.

Carrier frame 20 comprises leading and trailing edges, 21, 22, respectively, and a pair of spaced, parallel lateral edges 23, 24. The "leading" edge simply denotes that edge which is inserted into a disk drive (or into a storage rack) first. As is evident from the drawings, the carrier structure (notches N and cutouts C) used to precisely locate the carrier within a disk drive are symmetrically arranged with respect to both the X and Y axes, allowing the "trailing" edge to enter the disk drive first, if desired, and allowing either side of the disk to be facing upwardly when inserted.

According to the invention, each of the lateral edges 23, 24 of the carrier frame is provided with a rack of teeth which is adapted to be engaged by an endless conveyor mechanism of the type disclosed in the aforementioned U.S. application in the name of Deck et al. Such racks have a preferred pitch of about 2 teeth/cm. The spacing between adjacent teeth is about equal to the size of each tooth. The racks of teeth are preferably integral with the frame, which preferably comprises polycarbonate plastic, and are produced by the same injection molding process used for forming the carrier frame. When the carrier racks 23, 24 are engaged by the teeth of the toothed conveyor belts disclosed in the aforementioned Deck et al application for conveying disk carriers, the carrier is advanced forward or backward in the X direction. Owing to the fact that the racks extend along the entire length of the carrier edges, the toothed conveyor belts can extract a carrier from storage regardless of which end, 21 or 22, is accessible and, after extraction, will maintain control over the entire length of the carrier at all times.

The invention has been described in detail with particular reference to preferred embodiments thereof, but it will be understood that variations and modifications can be effected within the spirit and scope of the invention.

What is claimed is:

1. A carrier for a data storage disk, said carrier comprising (a) a generally rectangular frame defined by spaced, parallel leading and trailing edges and a pair of lateral edges extending between and perpendicularly intersecting said leading and trailing edges, said frame having a central aperture for receiving a data storage disk; (b) means for releasably supporting a data storage disk in said aperture; and (c) means defining racks of closely spaced teeth along the entire length of each of said lateral edges, said teeth being adapted to be engaged by a toothed conveyor for advancing said carrier in the plane of said frame.

* * * * *